Figure 1:
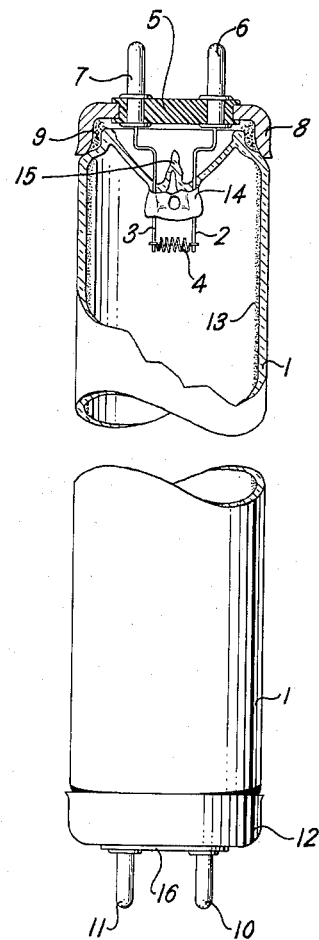

Dec. 20, 1960 M. A. AIA ET AL 2,965,786
CALCIUM HALOPHOSPHATE PHOSPHORS
Filed April 30, 1959

INVENTORS
STANLEY M. POSS
MICHAEL A. AIA
BY
Lawrence Burns,
ATTORNEY

United States Patent Office 2,965,786
Patented Dec. 20, 1960

2,965,786
CALCIUM HALOPHOSPHATE PHOSPHORS

Michael A. Aia and Stanley M. Poss, Towanda, Pa., assignors to Sylvania Electric Products Inc., a corporation of Delaware Filed Apr. 30, 1959, Ser. No. 809,942

8 Claims. (Cl. 313—109)

This invention relates to phosphors, and particularly to calcium halophosphate phosphors, which are used in fluorescent lamps and other devices.

We have discovered that when so used the efficiency of calcium halophosphate phosphors can be increased by incorporating in them a small amount of cadmium, for example, by adding a suitable cadmium compound to the mixture of ingredients fired to form the phosphor.

This result was unexpected, because when excited by an ultraviolet source outside the lamp, the phosphor containing a small amount of cadmium does not appear brighter than the phosphor without the cadmium. However, when used in a fluorescent lamp, the phosphor containing a small amount of cadimum was considerably brighter.

The amount of cadmium required is critical and should be quite small, for example about 0.05 gram-atom per 3.00 gram-mols of phosphate, that is, about 1% by weight of the phosphor. Larger amounts of cadmium, that is amounts of more than about 0.25 gram-atom per 3.00 gram-mols of phosphate or more than about 3% by weight after firing, will actually reduce the efficiency of the phosphor.

The amount of cadmium added is only a small fraction of the amount needed to combine with the halogen in the usual halophosphate formula $3Ca_3(PO_4)_2 \cdot CaX_2$, where X represents a halogen such as chlorine or fluorine, and so our material does not become $3Ca_3(PO_4)_2 \cdot CdX_2$, which has a red color and in fluorescent lamps is less efficient as a source of visible light, and which causes color variation on extended burning. In fact, there is no color shift toward the red with the phosphor of our invention, and the lamp efficiency is high.

The phosphor contains the usual antimony or manganese activator for halophosphates, and is generally used with both activators together.

The phosphor is especially effective for use in fluorescent lamps, and when used in such lamps the increase in efficiency of our phosphor over calcium halophosphate without cadmium is greater than the gain when the phosphor is excited by similar radiation outside of such a lamp, for example, by being placed on a plaque and irradiated by 2537 A. energy. Moreover, lamps with phosphors containing larger amounts of cadmium are generally characterized by poor maintenance of light output during life and by color variation on extended burning, whereas the phosphor of our invention actually has improved maintenance over phosphors without cadmium, and at no appreciable color variation.

An advantage of the invention is therefore an increase in the lumen output of fluorescent lamps utilizing calcium halophosphate phosphor, without appreciable shift in normal excitation or emission spectra, and without injurious effect upon the normal maintenance of lamp brightness during extended burning. The advantage is obtained by incorporating a small amount of cadmium into the calcium halophosphate lattice, in partial replacement of the calcium therein.

The addition of cadmium has a further advantage in that it makes the preparation of the phosphor less critical with respect to temperature.

Other objects, features and advantages of the invention will be apparent from the following specification, taken in connection with the accompanying drawing, in which the figures show one embodiment of the invention.

In Figure 1, the sealed glass envelope 1 has the lead-in wires 2, 3 sealed through one of its ends and corresponding lead-in wires sealed through the other end. The usual coiled-coil 4 of tungsten wire is supported between, and electrically connected to, the pair of lead-in wires 2, 3 and a similar coil is supported by and connected to the lead-in wires at the other end of the envelope 1. An insulating base piece 5 having contact pins 6 and 7, each pin being connected to one of the lead-in wires, held in the metal cap 8, which is fixed by the cement 9 to one end of the envelope 1, and a similar base piece 16, having contact pins 10 and 11, is cemented to the other end by cup 12.

The tungsten coils carry the usual electron-emitting coating of alkaline earth oxides, generally including also a small percentage of zirconium dioxide.

A filling of argon gas at about 2 millimeters of mercury pressure, and the usual small quantity of mercury is inside the glass envelope 1. The lamp has the usual stem press 14 and sealed exhaust tube 15.

On the inside surface of the envelope, is a coating 13 of the phosphor of our invention, which in this embodiment is a calcium halophosphate as described below, activated with antimony and manganese and containing a small amount of cadmium. It may be applied by the usual methods.

When used in the coating of such a lamp our phosphor gives an unexpected gain in efficiency over the phosphor without cadmium, although no appreciable difference in brightness between the phosphors is found when they are excited by ultraviolet radiation outside the lamps.

The quantity of cadmium required to effect improvement is critical, whereas the method of incorporation is not. Thus, the source of cadimum may be the chloride, carbonate, acetate, oxide, peroxide, phosphate or other suitable cadmium compounds. Intimate mixing of the phosphor raw material components including the cadmium compound, may be obtained by the usual milling operations, while luminescence is effectively developed by air-firing in closed crucibles or by nitrogen-firing in open crucibles. We prefer to use $CdNH_4PO_4$ or CdO as the source of cadmium since these are sufficiently reactive, relatively non-volatile, and are readily prepared at very high levels of purity. The quantity of Cd required in the starting materials to produce optimum brightness in lamps, using $CdNH_4PO_4$ or CdO, is about 0.02 to 0.5 gram-atom Cd per 3.00 gram-moles $PO_4$, depending on the method of firing as well as on formulation parameters. As a typical raw material composition for 4500° K. cool white phosphor we cite:

EXAMPLE 1

| Material | Gram-Moles | Grams | Wt. Percent |
|---|---|---|---|
| $CaHPO_4$ | 2.94 | 400.0 | 64.26 |
| $CdNH_4PO_4$ | 0.06 | 13.5 | 2.16 |
| $CaCo_3$ | 1.35 | 135.1 | 21.70 |
| $CaF_2$ | 0.40 | 31.2 | 5.01 |
| $NH_4Cl$ | .30 | 16.0 | 2.57 |
| $MnCO_3$ | .08 | 9.2 | 1.48 |
| $Sb_2O_3$ | .06 | 17.5 | 2.82 |
|  |  | 622.5 | 100.00 |

The ingredients, in apatite proportions such as those given, are intimately blended and then air-fired in closed crucibles at about 1130° C., or nitrogen-fired in open crucibles in a heated silica tube at about 1260° C. The resultant phosphors are given the usual post-firing treatment. The composition cited is given by way of example and not limitation. It is well known in the art that $CaCl_2$ or $SrCl_2$ (or other raw materials) may be used to prepare efficient phosphors, in replacement for part or all of the $NH_4Cl$ indicated in the example. However, such changes are considered to be within the spirit and scope of this invention.

Lamp testing showed that optimum Cd modification produces gains ranging from 1.0 to 3 or more lumens per watt at 100 hours life. Data from typical tests are given in the table below with optimum values underlined:

TABLE I

*Effects of Cd modification on lamp brightness of 3500° K. and 4500° K. white calcium halophosphate phosphors*

[The ° K. refer to color temperatures of light from the lamp]

| G.-atoms Cd Per 3.00 Mole Phosphate ($PO_4$) | LPW (vs. control) | | |
|---|---|---|---|
| | 0 Hrs. | 100 Hrs. | 500 Hrs. |
| Series #1 (3,500° K.): | | | |
| 0.00 | 69.6 | 67.4 | |
| .00 (Control) | 70.7 | 67.3 | |
| .10 | 0.6 | 0.7 | |
| .15 | 0.3 | 1.2 | |
| .20 | −1.7 | −1.1 | |
| .30 | −2.9 | −3.0 | |
| Series #2 (4,500° K.): | | | |
| 0.00 (Control) | 66.0 | 64.3 | 63.8 |
| .10 | 4.4 | 3.3 | 3.2 |
| .15 | 2.1 | 1.3 | 2.2 |
| .20 | 2.1 | 0.2 | 0.4 |
| .30 | −1.5 | −3.0 | |
| Series #3 (4,500° K.): | | | |
| 0.00 (Control) | 70.0 | 66.6 | 64.3 |
| .02 | 0.5 | 0.9 | |
| .04 | 1.6 | 2.0 | 3.1 |
| .06 | 2.7 | 2.9 | 2.2 |
| .08 | 0.4 | 1.3 | 1.3 |
| .10 | 1.1 | 0.7 | |
| .12 | 0.7 | 1.1 | |
| .14 | 0.7 | 1.1 | |
| Series #4 (4,500° K.): | | | |
| 0.00 (Control) | 69.9 | 67.6 | 65.8 |
| .05 | −0.1 | +1.0 | 1.7 |
| .10 | +0.1 | +1.0 | 2.0 |

From the results of Table I, it can be seen that in 13 cases where Cd was added in an amount not exceeding 0.15 atom Cd per 3.00 mole $PO_4$, gains in lumen output are observed in every instance. (The maximum LPW in each series, and the corresponding cadimum contents are underlined.)

At 1750 hours, Series No. 3 gave a gain of 2.5 LPW at 0.04 Cd, 3.1 LPW at 0.06 Cd and 1.3 LPW at 0.08 Cd. The full LPW (lumens per watt) figures are given for the control in each series, and for the other phosphors, there is given merely the number of LPW above the control in that series, a negative sign before the figure indicating an amount of LPW below the control.

Gains as high as 3.3 LPW have been observed. These results and the results of three other series are summarized in Table II.

TABLE II

*Summary of the effects on Cd modification on lamp brightness of 3500° K. and 4500° K. white calcium halophosphate phosphors*

| Phosphor Color Temperature | Optimum g.-atoms Cd per 3.00 moles $PO^4$ | Improvement Over Control (LPW) | |
|---|---|---|---|
| | | 100 Hrs. | 500 Hrs. |
| 3,500° K. White | .15 | 1.2 | |
| 4,500° K. White | .10 | 3.3 | 3.2 |
| Do | .06 | 2.9 | 3.1 |
| Do | .10 | 1.0 | 2.0 |
| Do | .06 | 2.4 | 1.6 |
| Do | .06 | 1.6 | 2.6 |
| Do | .06 | 1.5 | 1.5 |
| Average | .08 | 2.0 | 2.3 |

It is obvious that Cd effects substantial increases in lamp brightness up to a definite maximum quantity, although plaque brightnesses (not shown) give no indication of gains in the order of those found by lamp testing. Furthermore, the average gain at 500 hours burning is higher than that at 100 hours indicating improved maintenance, also. These observations, plus the fact that excitation-emission measurements show no appreciable shift in spectra with Cd modification up to about 0.15 g.-atoms Cd per 3.00 g.-mol $PO_4$ in 4500° K. white indicate the unexpected nature of the results obtained. The use of much larger quantities of Cd causes color shift toward deeper red emission. Such a color shift occurs when the $CaCl_2$ or $CaF_2$ in calcium halophosphate phosphor is replaced by $CdCl_2$. However, our measurements show that the small amounts of Cd added according to the present invention to improve lamp performance actually produce very slightly, greener, rather than redder, phosphors.

It is fortunate that we have found that only small amounts of Cd are required to give improved lamps, since in higher concentrations, this element creates numerous lamp processing difficulties. Fluorescent lamps containing Cd in higher concentrations (in excess of about 3%) are usually characterized by poor maintenance and by color instability on extended burning.

Excitation-emission data taken on selected members of Series #3 Table I are given below, and show that brightness increases obtainable by modification of calcium halophosphate phosphors with small amounts of Cd are not due to either (1) increased sensitivity to 254 mu excitation, or (2) color shift.

TABLE III

| Atoms Cd per 3.00 mols $PO_4$ | Excitation— Maximum Emission of 580 mu light (millimicrons) | Emission— Maximum Response to 254 mu Excitation (mu) | |
|---|---|---|---|
| | | Red | Blue |
| .00 | 253 | 583 | 480 |
| .06 | 252 | 583 | 477 |
| .14 | 252 | 582 | 477 |

Only a slight shift to shorter wavelengths is observed in the emission spectra with small amounts of Cd. The red emission is not enhanced over the range which creates improvements in the phosphor.

The phosphors in the various tables were made in the manner shown for the specific example, and with the same ingredients, although the proportions used were different for different series, the 3500° K. white requiring different proportions than the 4500° K. white, for example. But in each series, the only variation was the cadmium content, which had the values given in the corresponding table, everything else in the manufacture of the phosphor and lamp remaining the same, within the usual limits of phosphor laboratory techniques and of lamp manufacture. The lamps in which the phosphor was used were fluorescent lamps as described earlier in the present application, in connection with the drawing. The measurements were made on lamps in which the phosphor was used as a coating on the inside surface of the tube. The lamps were of standard 40-watt size, in a 1½ inch diameter glass tube, about 48 inches long.

Although the mole percentage of cadmium to phosphate will generally be about the same in the finished phosphor as in the starting mixture, the percent of cadmium by weight will be different in the final phosphor than in the starting mixture, as shown in the table below:

TABLE IV

*Variation of cadmium found in 4500° K. cool white phosphor with cadmium incorporated into the raw material mix, showing effect of cadmium upon 100-hr. lamp performance*

| Raw Material Mix | | Phosphor percent Cd Found | LPW 100 Hrs. (vs. Control) |
|---|---|---|---|
| g.-atom Cd per 3.00 mols $PO_4$ | Input Percent Cd | | |
| 0.00 | 0.00 | 0.047 | 67.5(Control) |
| .02 | .37 | .46 | +1.4 |
| .04 | .73 | .79 | 2.1 |
| .06 | 1.10 | 1.24 | 1.2 |
| .08 | 1.46 | 1.58 | 2.0 |
| .10 | 1.83 | 2.03 | 1.8 |
| .12 | 2.19 | 2.17 | 1.7 |
| .14 | 2.55 | 2.57 | 2.6 |

It will be noted from the above table that the original starting ingredients contained 0.047% cadmium, although no cadmium had been added to the original starting mix. It is believed that this small amount of cadmium present in the control was due to contamination from the processing apparatus, such as the furnace in which the material was fired, the furnace having been used for firing cadmium-containing phosphors prior to the above test. The full lumens per watt figure is given for the control, but only the gain in lumens per watt over the control is given for the other phosphors. The 1.4 figure for the phosphor with 0.02 g.-atom (gram-atom) cadmium, for example, means 1.4 LPW better than the control or 68.9 actual LPW.

The same system is used in the other tables, with the additional feature that maximum LPW gain in each test, and the amount of cadmium which produced it emphasized (by underlining in this application, and presumably by italicizing in any patent which may issue on the application) for convenience.

What we claim is:

1. A fluorescent lamp comprising a sealed envelope, electrodes therein, a filling of argon at low pressure therein, mercury therein, and a coating of phosphor on the inside surface of said envelope, said phosphor comprising calcium halophosphate containing between 0.01 and 0.25 gram-atoms of cadmium per 3.00 gram-moles of phosphate.

2. A calcium halophosphate phosphor containing between about 0.01 and 0.25 gram-atoms of cadmium per 3.00 gram-moles of phosphate.

3. A calcium halophosphate phosphor containing about 0.06 gram-atoms of cadmium per 3.00 gram-moles of phosphate.

4. A calcium halophosphate phosphor, activated by antimony and manganese, and containing between 0.01 and 0.25 gram-atoms of cadmium per 3.00 gram-moles of phosphate.

5. A calcium halophosphate phosphor containing between about 0.2% and about 3% by weight of cadmium.

6. A calcium halophosphate phosphor containing about 1% by weight of cadmium.

7. A calcium halophosphate phosphor, activated by antimony and manganese, and containing between about 0.2% to 3% by weight of cadmium.

8. A fluorescent lamp comprising a sealed envelope, electrodes therein, a filling of argon at low pressure therein, and a coating of phosphor on the inside surface of said envelope, said phosphor coating comprising calcium halophosphate containing between about 0.2% to 3% by weight of cadmium.

References Cited in the file of this patent

UNITED STATES PATENTS

| | | |
|---|---|---|
| 2,549,355 | Winninghoff | Apr. 17, 1951 |
| 2,579,900 | Butler | Dec. 25, 1951 |
| 2,607,014 | Roy et al. | Aug. 12, 1952 |
| 2,714,681 | Keiffer et al. | Aug. 2, 1955 |
| 2,755,254 | Butler | July 17, 1956 |
| 2,772,241 | Ramby | Nov. 27, 1956 |